US006675216B1

(12) United States Patent
Quatrano et al.

(10) Patent No.: US 6,675,216 B1
(45) Date of Patent: Jan. 6, 2004

(54) COPY SERVER FOR COLLABORATION AND ELECTRONIC COMMERCE

(75) Inventors: Stephen R. Quatrano, Lexington, MA (US); Charles D. Cummings, Lowell, MA (US)

(73) Assignee: Cisco Technolgy, Inc., San Jose, CA (US)

( * ) Notice: Subject to any disclaimer, the term of this patent is extended or adjusted under 35 U.S.C. 154(b) by 0 days.

(21) Appl. No.: 09/347,870

(22) Filed: Jul. 6, 1999

(51) Int. Cl.[7] .............................................. G06F 15/16
(52) U.S. Cl. ........................ 709/229; 709/204; 709/205; 709/225; 709/226
(58) Field of Search ................................ 709/204, 205, 709/225, 226, 229

(56) References Cited

U.S. PATENT DOCUMENTS

| | | | | |
|---|---|---|---|---|
| 5,862,330 A | * | 1/1999 | Anupam et al. | 709/204 |
| 5,954,798 A | * | 9/1999 | Shelton et al. | 709/224 |
| 6,070,185 A | * | 5/2000 | Anupam et al. | 709/204 |
| 6,105,055 A | * | 8/2000 | Pizano et al. | 709/204 |
| 6,112,240 A | * | 8/2000 | Pogue et al. | 709/224 |
| 6,144,991 A | * | 11/2000 | England | 709/205 |
| 6,161,137 A | * | 12/2000 | Ogdon et al. | 709/224 |
| 6,161,149 A | * | 12/2000 | Achacoso et al. | 710/4 |
| 6,178,439 B1 | * | 1/2001 | Feit | 709/200 |
| 6,185,602 B1 | * | 2/2001 | Bayrakeri | 709/204 |
| 6,230,185 B1 | * | 5/2001 | Salas et al. | 709/205 |
| 6,240,444 B1 | | 5/2001 | Fin et al. | 709/205 |
| 6,295,550 B1 | * | 9/2001 | Choung et al. | 709/204 |
| 6,295,551 B1 | * | 9/2001 | Roberts et al. | 709/205 |
| 6,298,356 B1 | * | 10/2001 | Jawahar et al. | 707/201 |
| 6,308,188 B1 | | 10/2001 | Bernardo et al. | 707/530 |
| 6,338,086 B1 | * | 1/2002 | Curtis et al. | 709/218 |
| 6,353,851 B1 | * | 3/2002 | Anupam et al. | 709/204 |
| 6,393,475 B1 | * | 5/2002 | Leong et al. | 709/223 |

* cited by examiner

*Primary Examiner*—Saleh Najjar
(74) *Attorney, Agent, or Firm*—Chapin & Huang, LLC; Barry W. Chapin, Esq.

(57) ABSTRACT

Systems and methods for collaborating over the Internet (or an intranet) in which two or more parties, such as a user and an agent, can share dynamic content generated by a web site server. Collaboration can be accomplished on live, dynamic pages without imposing a proxy server between user browsers and the web servers. Mechanisms prevent multiple submissions, and filters can be provided to selectively filter versions of a page for different users.

26 Claims, 3 Drawing Sheets

COPY SERVER FOR COLLABORATION AND ELECTRONIC COMMERCE

BACKGROUND OF THE INVENTION

Electronic commerce (e-commerce) is growing in popularity with increased use of the Internet and the world wide web. While some web sites just provide information over the web and then rely on telephone calls for placing orders or buying products and services, many other companies, including booksellers and mutual fund companies, allow purchases to be made and other commerce to be transacted over the web. These companies typically have a web server with back end processing software and a database with information that can be provided over the web, including product information and ordering forms. These sites are typically designed to generate dynamic content that is personalized and secure for self-service. If a user is having a problem working with a form on the web site or finding relevant information, the user may be able to call a call center to ask about the problem and describe what he or she sees.

A prior method for collaboration, in which content can be shared over the Internet between a user and an agent, is described in patent publication WO 97/42728, which is expressly incorporated herein by reference.

Dynamic content is content that requires some processing to typically add or select information that is customized or unique to the user in some way. For example, a user who is already known to the web site could be served with a form in which a name, address, and credit card number are filled in at the web site, in advance, for the convenience of the purchaser. Other examples include pages in which content is based on information provided by the user, such as mapping information that obtains from the user an initial position and a destination and performs calculations that determine the directions.

When more than one participant to a collaboration session wish to collaborate with respect to a page that has dynamic content, it is desirable that each user see the same dynamically generated content. However, it would not be desirable for each participant to have the same processing performed repeatedly, because such duplication would create additional overhead and potentially duplicate audit trails and even business transactions. Furthermore, it is very desirable to restrict access to the shared session to collaboration participants, protecting shared content from unauthorized access from the Internet.

SUMMARY OF THE INVENTION

The present invention includes systems and methods for collaborating over the Internet (or an intranet) in which two or more participants, such as one or more users and an agent, can share dynamic content generated by a web site server. The invention facilitates collaboration on real, active forms and dynamic pages without the need to impose a proxy server between user browsers and web servers. The invention also includes mechanisms to facilitate content capture, to prevent multiple submissions, to selectively filter content from either the agent or user views, and to limit collaborative access to collaboration participants.

The invention includes a copy server that can store dynamic content after it is generated by the web site in such a way that the content can be provided repeatedly to two or more participants to a collaboration session without interacting with a web content server, application server, or database. The use of the copy server thus eliminates additional overhead of producing identical dynamic pages for multiple participants, and in some applications will eliminate redundant database entries associated with the production of a dynamic page, such as form submissions and audit trails.

The copy server is different from a proxy server, in that, unlike proxied pages, the copied page in the copy server has live links and active buttons that direct all of the participants browsers back to the original web site rather than to the copy server.

The participants collaborate through a collaboration server, as described in the incorporated document. The content in the copy server can be protected and thus can be made secure such that only authorized participants to a collaboration session are permitted to collaborate using the shared content in the copy server. To accomplish this, the collaboration server communicates with the copy server to identify to the copy server the authorized participants to the collaboration session so that the copy server can restrict access to the content in the copy server.

The copy server can also present different pages to different participants using filters. Such different participants will typically be grouped by role, e.g., as an agent or as a user. The filter, copy server, and collaboration server work together to allow a user and an agent to have the same view of dynamic content where needed, and filter information from one or more different types of views so that one participant may not see everything that another participant does. Such filtering can be controlled, for example, such that the agent sees only what the agent needs, while excluding other content. One use for filtering is to remove a "submit" button from an order form to permit the agent and the user from both submitting the form on behalf of the user.

The present invention also includes components to capture dynamic content and store that content in the copy server. These components are called adapters because they are specific for different types of e-commerce platforms, making the copy server easier to use. In other words, they "adapt" the copy server to different e-commerce environments.

Another feature of the adapters (or appropriate custom code) is the ability to synchronize access to a page to prevent race conditions between multiple participants and to avoid redundant operations. Once identical copies of a page are loaded into multiple participant browsers, a race condition may be created if more than one participant operates on the page and then submits that page to the web server. The adapter only allows one participant to operate on the page through the adapter; subsequent operations are blocked. When a result page is generated from the operation in response to the participant who submitted the page, that resulting page is copied into the copy server and thus becomes the copied page for access by each participant.

Other features and advantages will become apparent from the following detailed description, drawings, and claims.

DETAILED DESCRIPTION

Figure 1:
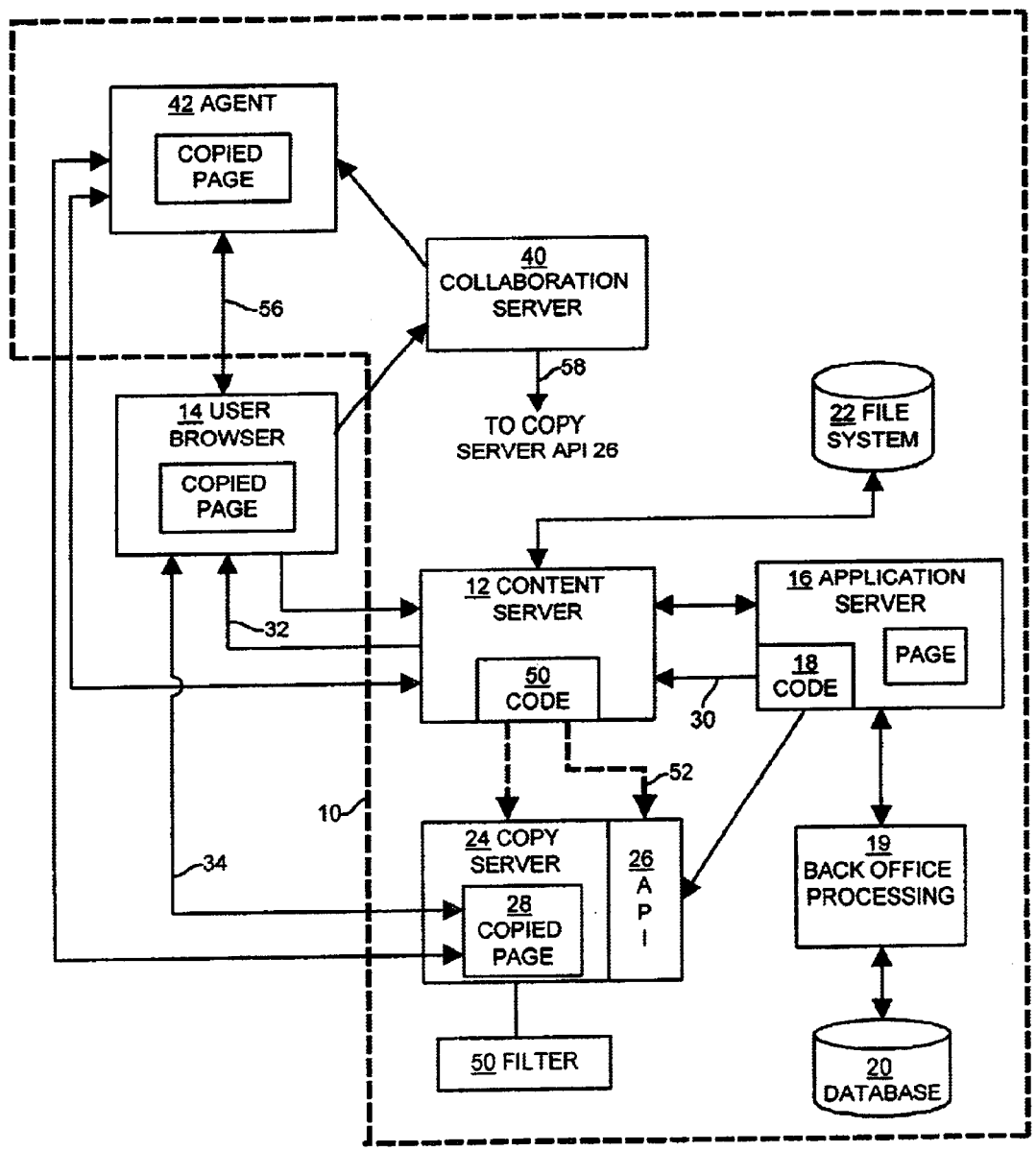
FIGS. 1 and 2 are block diagrams of embodiments of systems according to the present invention.

Referring to FIG. 1, an entity 10 that performs commerce over the Internet, such as an on-line financial services company or an on-line bookseller, has a web site with an HTTP content server 12 that allows a user browser 14 to interact with the web site. User browser 14 accesses content server 12 through the Internet to request information. If the user is requesting static content, i.e., a page of information that does not change regardless of who is accessing it, such as a typical home page, content server 12 can retrieve the page from its own file system 22 and serve the page to user browser 14. For dynamic content, content server 12 passes the request for information to an application server 16. If the application is intended merely to serve dynamic, personalized content, it might format a dynamic page whose content depends on the identity of the client browser. If the application server is a front end to a transaction-based system, then server 16 provides the request to back office processing 19, which uses data from the database 20 in order to provide the processed information back to user browser 14 via application server 16 and content server 12

With or without the back office processing 18 and database 20, this is known as a typical multi-user self-service (non-collaborative) environment. In such a case, a user may not recognize that the content is static or dynamic. Nevertheless, it is possible for each user to experience unique, personalized content which depends on the identity of the user.

According to the present invention, an additional server, referred to as a copy server 24, is provided. Application server 16 has code 18 that causes server 16 to interact with copy server 24 through an application programming interface (API) 26 in copy server 24. Application server 16 provides to the copy server 24 a copy of the page, form, or other dynamic content (referred to here generally as a "page") received from back office processing 19 to become copied page 28 in copy server 24. Copy server 24 stores copied page 28 along with a uniform resource locator (URL) associated with copied page 28 to allow subsequent access. Code 18 captures the page 28 that is provided from processing 19, causes copied page 28 to be stored in copy server 24, and obtains from copy server 24 the URL to identify the copied page. Code 18 then causes the browser 14 requesting the original page to be redirected to the copied page 28 in the copy server 24. The redirection is accomplished with a redirect header provided to content server 12 over connection 30, and then from content server 12 as indicated by line 32 to user browser 14.

User browser 14 thus receives the URL in the redirect header for copied page 28, and uses that URL as indicated by line 34 to automatically access copied page 28 over HTTP. The user, on receiving copied page 28, can then fill in information, for example, if the page is a form, and submit the form back to the web site through content server 12. All of the links in the page relate to the original content server 12 to force operations on the copied page 28 back to the original content server 12. Any resulting response from the application server 16 can again be stored as a copied page.

The copied page 28 is the basis for the collaboration. As described in the incorporated patent document, the user, if desiring a collaboration session, can provide the URL to a collaboration server 40, which forwards the URL to an agent browser 42, and if appropriate to other user browsers. Meanwhile, the user and agent can talk over a separate telephone line 56 or by using voice-over-IP. Agent browser 42 can then use that URL from collaboration server 40 to access and retrieve copied page 28, so that agent browser 42 and user browser 14 both have copied page 28 and both have direct access to the copied page. Such access to copied page 28 is desirable for the user and agent to be able to confer about the content of the copied page 28.

Collaboration server 40 is preferably an enterprise-class, HTTP server application that enables agents 42 to visually interact with remote users over the Internet while the user and agent can also conduct a voice conversation about the visually shared material To participate in a collaborative session, a customer need only have an Internet-connected computer and a Java-enabled browser. The voice connection can take place over a separate telephone line or over a single voice/data connection if the appropriate voice-over-IP (VoIP) hardware and software are in place. The agents can share static and dynamic web content with users, can navigate with the users around the web, demonstrate software, help users complete secure web-based forms, or transfer downloadable files, all while simultaneously conducting a voice conversation. Such collaboration is described in more detail in the incorporated patent publication.

One characteristic of copy server 24 is that the copied page 28 loaded into user browser 14 and agent browser contains live links to content server 12 directly, and that application server 16, back office processing 19, and database 20 were accessed (and perhaps updated) only one time in the original production of the copied page. This feature is thus unlike a proxy server in which the proxy server appears to the user to be the actual location of the information, when in fact the proxy server has an internal mapping to an actual location of the information. Bookmarks and historical (cached) pages stored in the browser come from the proxy server not the original source of the dynamic page. A proxy server would also have an undesirable limitation in that the proxy captures all the actual history of the client browser, depriving the content server of valuable data. The copy server 24, on the other hand, does not isolate the content server 12 from the client browser 14 nor does it isolate the server from the direct browse interaction.

In another embodiment of the present invention also shown in FIG. 1, code 18 of the type indicated above for use in application server 16 could alternatively be provided as code 50 in content server 12, with the code coupled to API 26 as represented by dashed line 52.

Copy server 24 can regulate access to copied page 28 so that only authorized participants in a collaboration session are permitted to access the copied page 28. Collaboration server 40 communicates via connection 58 and copy server API 26 to copy server 24 and tells copy server 24 when participants are added or removed from a collaboration session. Agent browser 42 and user browsers 14 request and receive unique cookies from copy server 24 via HTTP connections 34 if they identify themselves as authentic participants. Subsequent requests for copied pages are granted by the copy server 24 as long as the users are authentic participants in the session.

Figure 2:
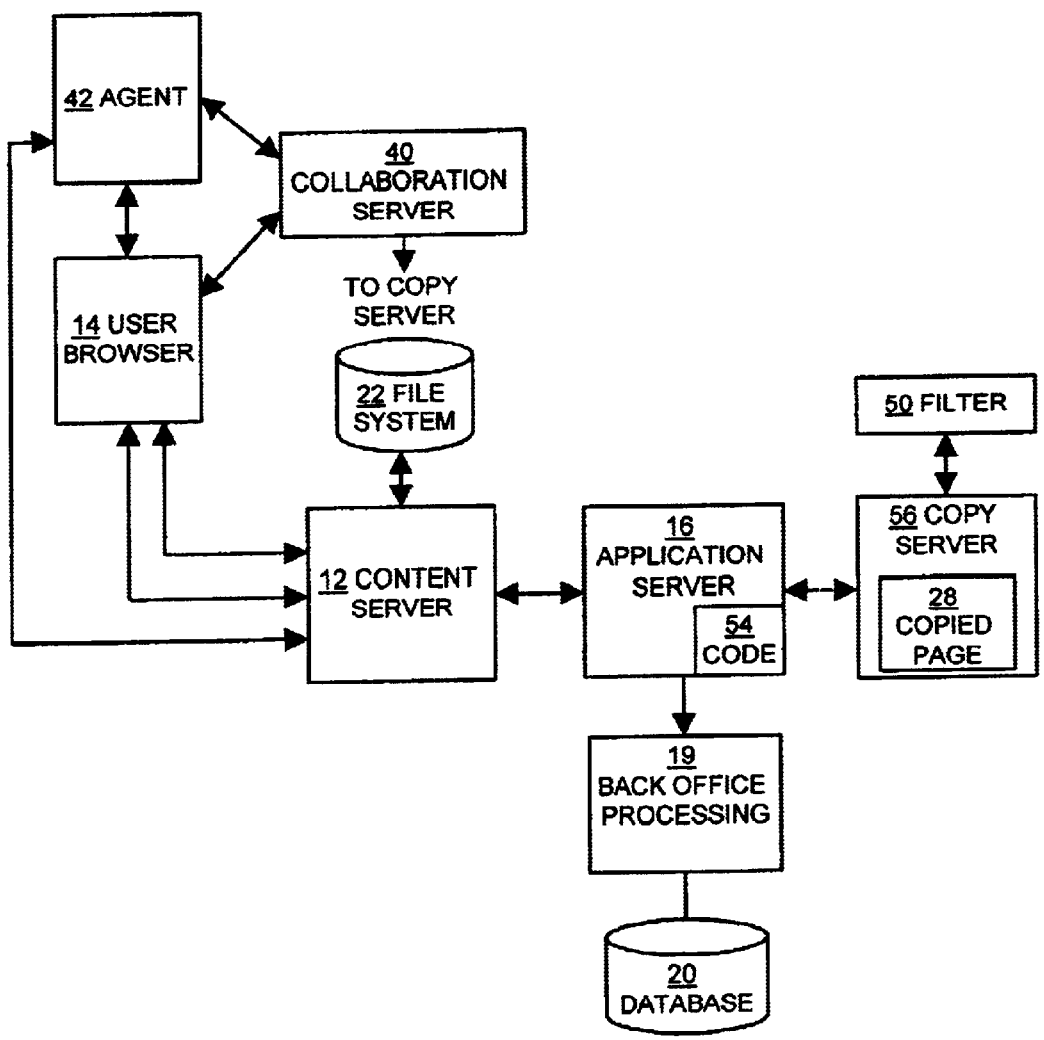

Referring to FIG. 2, in another embodiment of the present invention, unlike the embodiment of FIG. 1 in which the user and agent can directly access copied page 28 from a copy server, a copy server 56 is located behind the security infrastructure of content server 12 and application server 16. Server 16 has code 54 for interacting with copy server 56. In this case, the process is similar to that in the embodiment of FIG. 1, except that the user browser 14 is redirected to copied page 28 through application server 16 and code 54. This approach is more secure, and can take advantage of a more powerful application server for faster processing, although it does mean that the application server will have more functions to perform.

The server code for interacting with the copy server, whether code 18, 50, or 54, each be custom code written by application programmers or system integrators on site for use with copy server API 26. As custom code, it becomes part of the application infrastructure of the site. Alternatively, such code may be an off-the-shelf product, installed and part of the systems infrastructure of the site. As a product, it is a specialized "adapter" that permits a generic plug-in copy server 24 or 56 technology to interoperate with a variety of application server 16 and content server 12 platforms without requiring custom code. Generic adapter technology is "ported" or "adapted" to many specific web server 12 and application server 16 platforms.

The server code for interacting with the copy server, whether code 18, 50, or 54 may also be configured to allow certain URL's to pass through without being copied and without the requesting browser 14 or 42 being redirected. In some cases this is desirable to distribute cookies and other header information to all participants' browsers.

The system of the present invention also preferably includes a filter 50 that operatively works with copy server 24 to determine who the user is, what page the user is requesting, and what information each participant can see. This filter 50 can be used to share some portions of the copied page among all participants but not all portions of the page. Such a filter 50 can preserve secrecy, provide efficiency, and prevent accidental or malicious entry of an order by the wrong participant. The security issue can arise in case information can be displayed on a screen that should not be seen by an agent or user, e.g., if the user accesses account information that also references another user's information, or if an agent needs to check a resource on the web site that also has information that is confidential to other parties. The filter 50 can also be used to offer a button to one participant in a collaborative session while removing it from another, preventing the accidental or malicious operation on a copied page by the wrong user.

Efficiency savings can be obtained because the filter can avoid the need to display unnecessary information on both views, such as additional features that are available but for which agent services are not required, or to filter out logos, advertising, or other information not needed by the agent.

Filter 50 essentially modifies copied page 28 in order to provide that copied page 28 back to the user or the agent 42 thus providing a user version and an agent version of the copied page 28. Because the agent 42 is associated with the web site entity, the agent 42 can either register through collaboration server 40 to copy server 24 or the agent 42 may be identifiable based on an aspect of their request. The filter 50 will thus be able to discriminate the user version of the copied page from the agent version of the copied page. The filtering code will typically be associated with particular pages, such that for a particular form and type of participant (agent or client), the code will suppress some piece of the form.

Figure 3:
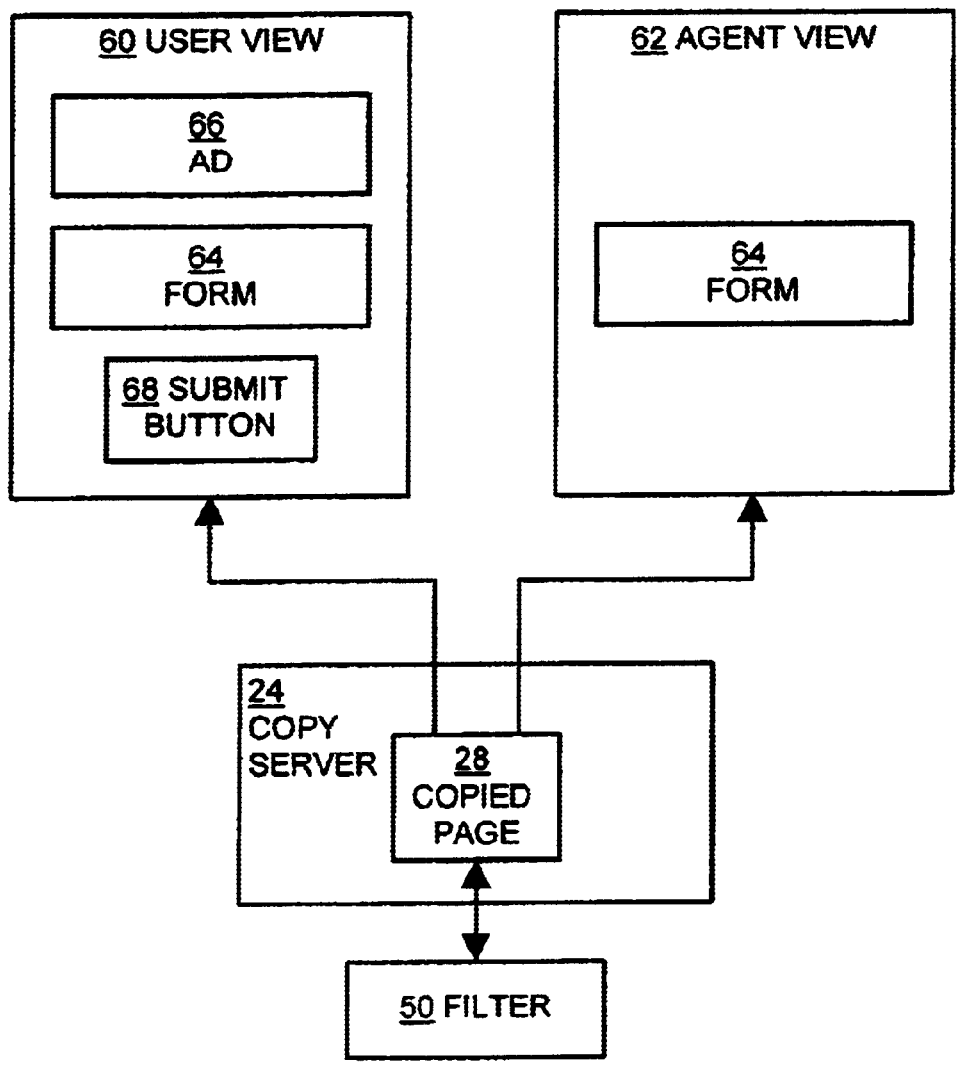
FIG. 3 is a block diagram illustrating the filtering function.

As shown in FIG. 3, copy server 24 can provide copied page 28 to a user view 60 or an agent view 62. In this example, user view 60 has a form region 64, an ad 66, and a submit button 68. Agent view 62, however, only has form 64 but does not provide ad 66, and also does not provide submit button 68 that would otherwise allow either participant to submit the form. This filtering can be achieved with code designed for and associated with specific forms, or certain types of information, such as a PIN, can always be suppressed to the agent. Thus, a request for the page causes a filter routine to be invoked to determine how to display information.

To prevent multiple processing on a page, the server code for interacting with the copy server, whether code 18, 50, or 54 can determine when a page has been submitted and prevent a further submission until a result page is sent. Referring again to FIGS. 1 and 2, assume there is a collaboration session and a first user enters information into the copied page and submits the page back to the web site for processing. The operation is sent from user browser 42 or 14 to content server 12 to application server 16 where code 18 is invoked to determine if this is the first operation on a copy or not. If it is the first operation on the copy, the application continues and may interact with back office processing 19 and database 20. If a second user (or agent) tries to submit the page with different inputs, code 18 stops the processing on the second submission and generates and returns a configurable "please wait" result page to the second user's browser indicating that the second user has to wait. When the first submission is processed, a resulting page is captured by code 18, stored as a copied page 28 in the copy server 24, and the first user is redirected to the copy page. Once the copied page becomes current in the collaboration server 40, it replaces the "please wait" page on the second user's browser and can be viewed and discussed further by the participants. The system thus prevents inconsistent or duplicative submissions of the shared copied page.

Having described preferred embodiments of the present invention, it should be apparent that modifications can be made without departing from the scope of the invention as defined by the appended claims.

What is claimed is:

1. A method for providing collaboration between a first user and a second user comprising:

receiving, by a web site, a request from the first user with a browser;

processing the request with information related to the first user to create a page with dynamic content;

copying the page with dynamic content into a copy server without changing any locators in the page, the copy server having the page with dynamic content as a copied page;

providing, to the first user, a locator for the copied page of the copy server, the locator allowing the first user to access the copied page from the copy server; and providing, to the second user, the locator for the copied page of the copy server, the locator allowing the second user to access the copied page from the copy server, the first user and the second user viewing versions of the same copied page.

2. The method of claim 1, wherein the versions of the copied page obtained by the first and second users are identical.

3. The method of claim 1, further comprising filtering the copied page to cause a different version of the copied page to be provided to different users.

4. The method of claim 3, wherein the filtering suppresses a portion of one of a user view and an agent view.

5. The method of claim 1, further comprising capturing the versions of the copied page and storing the versions of the copied page in the copy server with a plug-in adapter to an application server.

6. The method of claim 1, further comprising capturing the versions of the copied page and storing the versions of the copied page in the copy server with a plug-in adapter to a web server.

7. The method of claim 1, further comprising capturing the versions of the copied page and storing the versions of the copied page in the copy server with custom code in an application.

8. The method of claim 1, further comprising redirecting the first user to have direct access to the copy server without passing through other web servers to obtain the copied page.

9. The method of claim 2, further comprising redirecting the first user to have direct access to the copy server without passing through other web servers to obtain the copied page.

10. The method of claim 3, further comprising redirecting the first user to have direct access to the copy server without passing through other web servers to obtain the copied page.

11. The method of claim 1, further comprising redirecting the first user to the copied page through an application server.

12. The method of claim 2, further comprising redirecting the first user to the copied page through an application server.

13. The method of claim 3, further comprising redirecting the first user to the copied page through an application server.

14. The method of claim 1, wherein, in response to first submission of information relating to the copied page by a first user, preventing, by the web site, a second submission of information relating to that copied page by another user.

15. The method of claim 2, wherein, in response to a first submission of information relating to the copied page by a first user, preventing, by the web site, a second submission of information relating to that copied page by another user.

16. The method of claim 3, wherein, in response to first submission of information relating to the copied page by a first user, preventing, by the web site, a second submission of information relating to that copied page by another user.

17. A web site system comprising:
a web server accessible to users with browsers for causing the web site to generate dynamic content as a page;
a copy server for storing and serving copies of the page of dynamic content, the page having an associated locator to allow access to the page;
the web server having an adapter for capturing the copied page, redirecting and synchronizing access to the copied page;
a collaboration server for communicating with the first and second users to coordinate the first and second users to view the copied page together, the first user accessing the copied page via the locator and the second user accessing the copied page via the locator; and
a filter for modifying the copied page so that first and second different versions of the dynamic content are provided to the first and second users, respectively.

18. The system of claim 17, wherein the application server has an adapter for capturing the copied page, redirecting and synchronizing access to the copied page.

19. The system of claim 17, wherein the application server has custom code for capturing the copied page, redirecting and synchronizing access to the copied page.

20. The system of claim 17, wherein the web server is an HTTP server.

21. A computerized device comprising:
at least one communications interface;
a controller; and
an interconnection mechanism coupling the at least one communications interface and the controller;
wherein the controller is configured to:
receive, by a web site, a request from a first user with a browser;
process the request with information related to the first user to create a page with dynamic content;
copy the page with dynamic content into a copy server without changing any locators in the page, the copy server having the page with dynamic content as a copied page;
provide to the first user a locator for the copied page of the copy server to allow the first user to access the copied page from the copy server by using the locator; and
provide to a second user the locator for the copied page of the copy server to allow the second user to access the copied page from the copy server by using the locator, the first user and the second user viewing versions of the same copied page.

22. A computer program product having a computer-readable medium including computer program logic encoded thereon that, when performed on a controller in a computerized device having a coupling to at least one communications interface provides a method for performing the operations of:
receiving a request from a first user with a browser;
processing the request with information related to the first user to create a page with dynamic content;
copying the page with dynamic content into a copy server without changing any locators in the page, the copy server having the page with dynamic content as a copied page;
providing, to the first user, a locator for the copied page of the copy server, the locator allowing the first user to access the copied page from the copy server; and
providing, to a second user, the locator for the copied page of the copy server, the locator allowing the second user to access the copied page from the copy server, the first user and the second user viewing versions of the same copied page.

23. A computerized device comprising:
at least one communications interface;
a controller; and
an interconnection mechanism coupling the at least one communications interface and the controller;
wherein the controller is configured to produce a means for providing collaboration for dynamic content, such means including:
means for receiving a request from a first user with a browser;
means for processing the request with information related to the first user to create a page with dynamic content;
means for copying the page with dynamic content into a copy server without changing any locators in the page, the copy server having the page with dynamic content as a copied page;
means for providing, to the first user, a locator for the copied page of the copy server, the locator allowing the first user to access the copied page from the copy server; and
means for providing, to a second user, the locator for the copied page of the copy server, the locator allowing the second user to access the copied page from the copy server, the first user and the second user viewing versions of the same copied page.

24. A method for providing collaboration for dynamic content comprising the steps of:
receiving a dynamic content request from a first user;

processing the dynamic content request with information related to the first user to create a page with dynamic content, the page with dynamic content having a page address;

copying the page with dynamic content as a copied page into a copy server, the copied page having the page address;

providing to the first user the page address for the copied page from the copy server to allow first user to obtain the copied page from the copy server;

providing to a second user the page address for the copied page of the copy server to allow second user to obtain the copied page from the copy server, the first user and the second user each viewing a version of the copied page;

receiving a first submission of information relating to the copied page by the first user; and preventing a second submission of information relating to the copied page by the second user, based upon receiving the first submission of information.

25. A method for providing collaboration between a first user and a second user comprising:

receiving, by a web site, a request from the first user with a browser;

processing the request with information related to the first user to create a page with dynamic content;

copying the page with dynamic content into a copy server without changing any locators in the page, the copy server having the page with dynamic content as a copied page;

providing, to the first user, a locator for the copied page of the copy server, the locator allowing the first user to access the copied page from the copy server;

providing, to the second user, the locator for the copied page of the copy server, the locator allowing the second user to access the copied page from the copy server, the first user and the second user viewing versions of the same copied page; and allowing the first user to operate on the page with dynamic content while blocking the second user from operating on the page with dynamic content.

26. The method of claim 25 further comprising:

generating a result page based upon operation, by the first user, on the page with dynamic content; and copying the result page as a copied page on the copy server; and allowing the first user and the second user access to the copied page.

* * * * *